United States Patent [19]

Ellis et al.

[11] 3,806,812

[45] Apr. 23, 1974

[54] RADIO FREQUENCY DATA COMMUNICATION SYSTEM

[75] Inventors: Arthur W. Ellis, Templeton; Peter N. Baum, Tyngsboro, both of Mass.

[73] Assignee: Raytheon Company, Lexington, Mass.

[22] Filed: Mar. 1, 1972

[21] Appl. No.: 230,705

[52] U.S. Cl. .................. 325/163, 178/67, 332/16 T

[51] Int. Cl. .............................................. M03c 3/26

[58] Field of Search...... 325/163; 178/67; 332/16 T, 332/23 R, 24

[56] References Cited

UNITED STATES PATENTS

| | | | |
|---|---|---|---|
| 3,665,474 | 5/1972 | Thayer | 178/67 X |
| 3,585,503 | 6/1971 | Rittenbach | 178/67 X |
| 3,502,809 | 3/1970 | Dickey | 178/67 |
| 3,112,448 | 11/1963 | McFarlane et al. | 325/163 |
| 3,119,964 | 1/1964 | Crafts | 178/67 X |

*Primary Examiner*—Felix D. Gruber
*Assistant Examiner*—James F. Gottman
*Attorney, Agent, or Firm*—Richard M. Sharkansky; Philip J. McFarland; Joseph D. Pannone

[57] ABSTRACT

A data communication system is disclosed, wherein an intermediate frequency signal is binary phase coded and heterodyned with a radio frequency signal to produce a single sideband signal which is amplified in a cross field amplifier. The binary phase coding is provided by a phase rotation modulator which rotates the phase of the intermediate frequency signal 180° in accordance with a binary signal. The phase is rotated in a manner that the envelope of the signal into the cross field amplifier remains substantially constant at all times.

5 Claims, 5 Drawing Figures

RADIO FREQUENCY DATA COMMUNICATION SYSTEM

The invention herein described was made in the course of or under a contract or subcontract thereunder, with the Department of Defense.

BACKGROUND OF THE INVENTION

This invention relates generally to high power radio frequency data communication systems wherein such data is transmitted as a binary phase-coded signal, and more particularly to phase rotation modulators used in such systems for phase coding such data.

As is well known in the art, it is sometimes desirable to send data from one station to a second station via a radio frequency communication system. In such an application it is generally necessary to transmit radio frequency signals, such signals being modulated in accordance with data to be sent. One technique used to modulate such radio frequency signals is to first convert the data into binary signals and then to code the radio frequency signals therewith, for example, in a manner commonly referred to as binary phase-coding.

As is further known in the art, when the power of the transmitted signals is greater than about 5 KW it is sometimes desirable to use a "cross field amplifier" in the transmitter. The binary phase-coding for such an amplifier is generally implemented by modulating, in accordance with data to be transmitted, intermediate frequency (I.F.) signals in a phase rotation modulator. The modulated I.F. signals at the output of the phase rotation modulator are then heterodyned with the output of a radio frequency oscillator in a mixer. The output signals from the mixer are passed through a bandpass filter to produce single sideband R.F. signals at a relatively low power level. Such signals are first amplified in, for example. a TWT and then further amplified in a cross field amplifier. The resulting modulated radio frequency signals are, finally, transmitted to the receiver station. When binary phase coding is used, the phase rotation modulator referred to hereinbefore is operative to reverse the phase of the intermediate frequency signals each time the level of the binary signals change, that is, each time the binary signal changes from a logic 1 to a logic 0, or vice versa. One known phase modulator for such a purpose includes a diode switching network, such network being responsive to binary signals in a manner such that the input and output terminals of the phase modulator are interconnected in a reversed polarity each time the level of the binary signals changes. It has been found, however, that known diode switching networks operate in such a manner that the signals at the output terminal of known phase modulators are discontinuous. As a result, the frequency spectra of the output signals have frequency components which are outside the bandwidth of the bandpass filter. Consequently, a portion of the modulated radio frequency signals is lost whenever the diode switching network operates. Therefore, because of the loss of energy in the signal out of the narrow band filter, the envelope of the signals applied to the cross field amplifier is then at, or near, a null. As is known and described in "Radar Handbook" by Merrill I. Skolnik, published by McGraw-Hill Inc., New York, New York, 1970, (pages 7–15), a cross field amplifier has the characteristic of generating a burst of broadband noise each time the envelope of the input signals applied thereto nears a null condition. It follows, then, that the transmitted signals include bursts of noise, thereby making detection of the transmitted data at the receiving station difficult.

SUMMARY OF THE INVENTION

It is therefore an object of the invention to provide an improved phase rotation modulator for use in a higher power radio frequency communication system wherein data is transmitted as a binary phase-coded signal.

This and other objects of the invention are attained generally by providing, in a radio frequency communication system, a phase rotation modulator wherein the phase of an intermediate frequency signal is rotated continuously through a 180° change in response to a binary signal so that, after heterodyning the signal at the output of such modulator with a radio frequency signal, the frequency spectrum of the resulting signal has significant components within the bandpass of a single sideband bandpass filter. The phase rotation modulator includes means for producing a pair of oppositely phased intermediate frequency signals and means for coupling, in accordance with a binary input signal, the pair of I.F. intermediate frequency signals to an output terminal in a manner that the phase of the resulting signal at such output terminal rotates through 180°. A driver, responsive to the binary input signal, provides a pair of oppositely phased signals, such signals having a predetermined rise time. The signals provided by such driver control the state of a pair of active elements in a manner that one of the pair of oppositely phased intermediate frequency signals passes selectively through a first or second resistive impedance and the other one of such pair of signals passes selectively through an inductive reactive impedance or a capacitive reactance impedance whereby, as the resistance of each one of such pair of active elements changes during the rise time, the signal at the output of the phase rotation modulator rotates through 180°. The rise time is selected by considering the frequency spectrum characteristic desired for the signal at the output of the phase rotation modulator and the time response of detection apparatus in the receiver of the communication system.

BRIEF DESCRIPTION OF THE DRAWINGS

For a more complete understanding of the invention reference is now made to the following figures wherein.

DESCRIPTION OF THE PREFERRED EMBODIMENT

Figures 1, 2, 3:
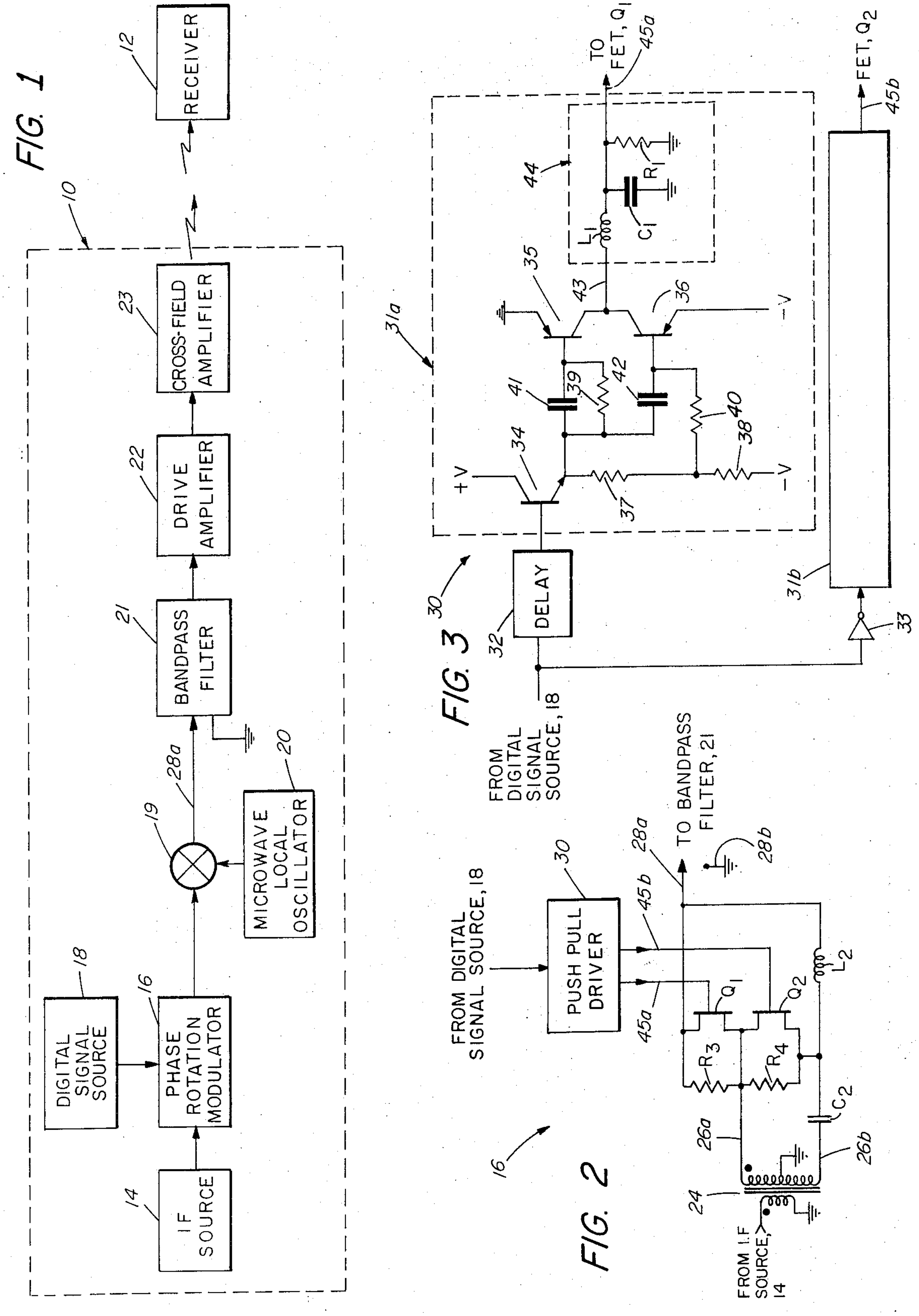
FIG. 1 is a block diagram showing a radio frequency data communication system embodying the principles of the invention.
FIG. 2 is a schematic diagram of a phase rotation modulator according to the invention for use in the transmitter of the radio frequency data communication system shown in FIG. 1.
FIG. 3 is a schematic diagram of a push pull driver used in the phase rotation modulator shown in FIG. 2.

Referring now to FIG. 1, a radio frequency data communication system is shown to include a transmitter 10 and a receiver 12. Transmitter 10 includes an intermediate frequency (I.F.) source 14, the signals produced at the output of I.F. source 14 being any convenient intermediate frequency, here 50 MHZ. A phase rotation modulator 16 is coupled to such signal source as shown. The phase rotation modulator 16, the details of which will be described later, is responsive to binary signals produced by digital signal source 18, such modulator being used to binary phase code the intermediate frequency signal produced by I.F. source 14. That is, the output signals of phase rotation modulator 16 are signals with a frequency of 50 MHZ. However, the phase of such signals is rotated continuously through 180°, in a manner to be described, each time the level of the binary signals changes from a logic 1 to a logic 0 or from a logic 0 to a logic 1. The signals at the output of phase modulator 16 are heterodyned in a mixer 19 with signals produced by a microwave oscillator 20, such signal here having a frequency 5.0 GHZ. The upper sideband of the signals produced by mixer 19 is passed through a bandpass filter 21, such filter here having a bandpass centered at 5.05 GHZ and a bandwidth of 40 MHZ. The signals produced at the output of bandpass filter 20 are passed through a conventional drive amplifier 22, here a TWT, and then further amplified in a cross field amplifier 23, here an amplitron having an output power capability of over 5 Kw. The binary phase coded signals produced at the output of cross field amplifier 23 are sent to receiver 12, here of any conventional type which would include any known means for decoding the binary phase coded signals sent thereto by transmitter 10. Such receiver 12 may, therefore, include a ring modulator or double balanced mixer combined in a conventional manner (not shown) with a 1 bit delay network.

Referring now to FIG. 2, phase rotation modulator 16 is shown to include a transformer 24, such transformer having a relatively low output impedance and a grounded center tap. The I.F. signals produced by I.F. source 14 (FIG. 1) are, therefore, coupled to lines **26*a* and 26*b* to form a pair of oppositely phased I.F. signals. Such I.F. signals are coupled to an output terminal 28*a*, (output terminal 28*b* being grounded, as shown) in a manner now to be described, in response to the binary signals produced by binary signal source 18 (FIG. 1**).

The digital signal source 18 (FIG. 1) is connected to a push pull driver 30, the details of which will be described later. Suffice it to say here that such driver produces a pair of signals on lines **45*a*, 45*b* respectively, such pair of signals being used as gating signals for a pair of FET $Q_1$, $Q_2$ respectively. The waveforms of such pair of signals will be described in detail later; however, it is here noted that there is a relative 180° phase difference between each one thereof. Therefore, when $Q_1$ is "on" $Q_2$ if "off" and when $Q_1$ is "off" $Q_2$ is "on," the state of $Q_1$ and $Q_2$ changing in response to the digital signals from digital signal source 18. (FIG. 1**).

Now completing the description of phase rotation modulator 16, resistors $R_3$ and $R_4$ are connected in shunt with $Q_1$ and $Q_2$ respectively as shown. One end of resistor $R_3$ is connected to terminal **28*a* and to the drain of $Q_1$. The second end of the resistor $R_3$ is connected to the source of $Q_1$ and the drain of $Q_2$. One end of resistor $R_4$ is connected to the second end of resistor $R_3$ and the second end of resistor $R_4$ is connected to the source of $Q_2$ and to the junction between a capacitor $C_2$ and an inductor $L_2$. One end of inductor $L_2$ is connected to output terminal 28*a*, and one end of capacitor $C_2$ is connected to line 26*b***, as shown. The series resonance frequency of $C_2$,$L_2$ is at a frequency $2\pi\ 1/\sqrt{L_2C_2}$, which is lower than the frequency, $f$, of the intermediate frequency signals. In addition, $2\pi fL_2 >> ½\pi fC_2$.

Before discussing the operation of phase rotation modulator 16 it should first be recognized that such modulator is preferably terminated in a high impedance and that, therefore, an insignificant amount of current flows from terminal **28*a* to mixer 19 (FIG. 1). Let it be assumed that $Q_1$ is "on" and $Q_2$ is "off" so that the path for the current flow of the I.F. signals includes line 26*a* through $Q_1$, inductor $L_2$, capacitor $C_2$, line 26*b* to ground. Because the frequency of such I.F. signals is greater than the series resonance frequency associated with $L_2$, $C_2$, the impedance between line 26*b* to terminal 28*a* may be considered to be "inductive," with an inductive reactance component equal to $2\pi fL_2$. The impedance from line 26*a* to terminal 28*a* may be considered to be purely resistive with a resistance "R," where "R" substantially equals the resistance of the parallel combination of $R_3$ and the resistance of $Q_1$. Therefore, if the voltage from ground to line 26*a* is $e_1$, and the voltage from ground to line 26*b* is $-e_1$, the relationship between the voltage, $e_0$, between ground and terminal 28*a*** may be expressed as $$e_0/e_1 = (-R + j2\pi fL_2)/(R + j2\pi fL_2) \quad (1)$$

It is first noted from Eq. (1) that the gain relationship between $e_0$ and $e_1$ is unity regardless of the value of R. It is next noted that the phase angle $\phi$ between $e_0$ and $e_1$ may be expressed as $$\phi = \tan^{-1}[2(2\pi fL_2)R]/[(2\pi fL_2)^2 - R^2] \quad (2)$$

and that such phase angle $\phi$ may be, ideally, any value between 0° and 180°, such phase angle being dependent on the value of R.

Now considering the alternative state of $Q_1$ and $Q_2$, that is, when $Q_1$ is "off" and $Q_2$ is "on," it is first noted that no significant current will flow through $L_2$ because the phase modulator 16 is terminated in a high impedance, as discussed above. Therefore, the impedance between line **26*a* and terminal 28*a* may be considered resistive, with a resistance R' where R' substantially equals the parallel combination of $R_4$ and the resistance of $Q_2$ and the impedance from line 26*b* to terminal 28*a*** may be considered as "capacitive" with capacitive reactance component equal to $½\pi fC_2$. The relationship between $e_0$ and $e_1$ may therefore be expressed as $$e_0/e_1 = (-R' + 1/j2\pi fC_2)/R' + 1/j2\pi fC_2) \quad (3)$$

It is first noted from Eq. (3) that, as in Eq. (1), the gain relationship between $e_0$ and $e_1$ is unity regardless of the value of R'. It is next noted that the phase angle $\phi$ between $e_0$ and $e_1$ may be expressed as:

$$\phi = \tan^{-1}[-2R'/2\pi fC_2]/[(1/2\pi fC_2)^2 - R^2] \quad (4)$$

A little thought will make it apparent therefore that the angle $\phi - \phi'$ may be made equal to 180° by proper selection of R and R' and therefore with such selection the phase of the signal at terminal 28*a* relative to the I.F. signal from I.F. source 14 will change 180° as the state of both $Q_1$ and $Q_2$ change. The phase relationship between $e_0$ and $e_1$ may thereby be changed 180° by operating $Q_1$ and $Q_2$ in opposite states and switching such states synchronously in response to binary signals from digital signal source 18 and by making (*a*) $R'=R<<X_L$; and (*b*) $R = R' = \sqrt{X_{L2}X_{C2}}$, where $X_L = 2\pi fL_2$ and $X_C = 1/2\pi fC_2$.

Figure 4:
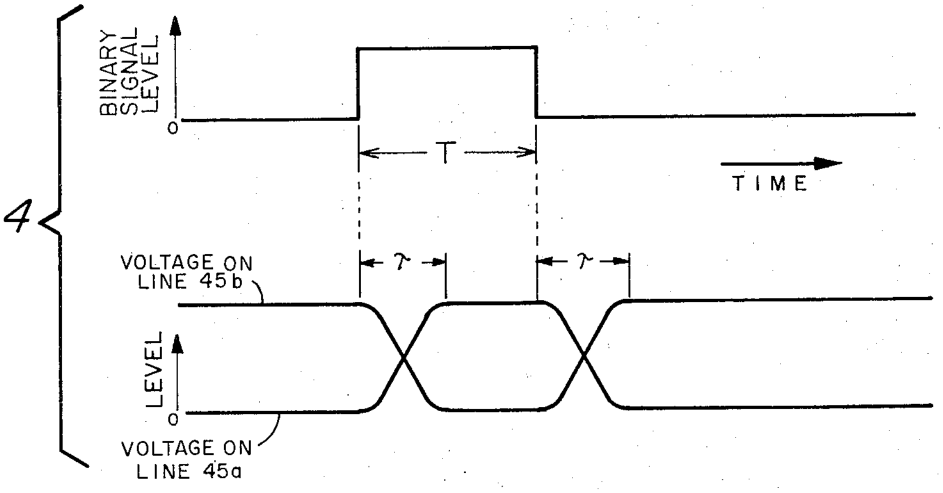
FIG. 4 is a sketch showing the waveform of the signals produced at the output of the push pull driver shown in FIG. 3 and the relationship of such signals to binary signals used in the radio frequency data communication system of FIG. 1.

The control of $Q_1$ and $Q_2$ is here by operation of push pull driver 30 (FIG. 3). Such driver includes two identical gate sections 31*a*, 31*b*, (only section 31*a* being shown in detail), such sections being connected, respectively, to digital signal source 18 through a delay network 32 and an inverter 33, as shown. Each section includes transistors 34, 35, 36, such transistors being properly biased in a conventional manner by means of resistors 37–40 and power supplies +V, −V. Transistors 35 and 36 are also AC coupled to the transistor 34 through capacitors 41, 42. In operation, as to exemplary section 31*a*, when the binary signals from binary signal source 18 (FIG. 1) are "high," the signals on line 43 are "low" and when such binary signals are "low" the signals on line 43 are "high." A shaping network 44 couples the signals on line 43 to line 45*a*. Shaping network 44 includes resistor $R_1$, inductor $L_1$ and capacitor $C_1$, arranged as shown. The function of shaping network 44 is to shape the time characteristic of the signals appearing on line 45*a*. In particular, such network 44 is designed such that the signals on line 45*a* will have a desired rise time, here a rise time, $\tau$(sec.), of about 50 percent of the pulse width of each bit of the digital signal. The pulse width of such digital signal is T(sec.). The signals produced at the output of section 31*b* on line 45*b* are 180° out of phase relative to the signal on line 45*a* because of inverter 33. Delay network 32 is used to cancel the effect of any delay inherent in inverter 33 and to compensate for any nonlinearity in FET $Q_1$, $Q_2$. The signals at the output of sections 31*a*, 31*b* are shown in FIG. 4. The relationship between $\tau$ and T is selected by considering the time required by the receiver 12 (FIG. 1) to detect each 180° phase reversal in the received signal and the spectral bandwidth of the signal produced by the modulator 16. The spectral bandwidth of such signal has maximum energy within the bandpass of bandpass filter 21 (FIG. 1) within the constraint of receiver detectibility just mentioned. A little thought will make it apparent that the signals at the output of phase rotation modulator 16 rotates continuously through 180° without any change in amplitude each time the level of the binary signals from digital signal source 18 change. That is, as the resistance of each one of the FET's $Q_1$, $Q_2$ changes during the rise time, $\tau$, the signal at the output of phase rotation modulator 16 rotates through 180°.

Figure 5:
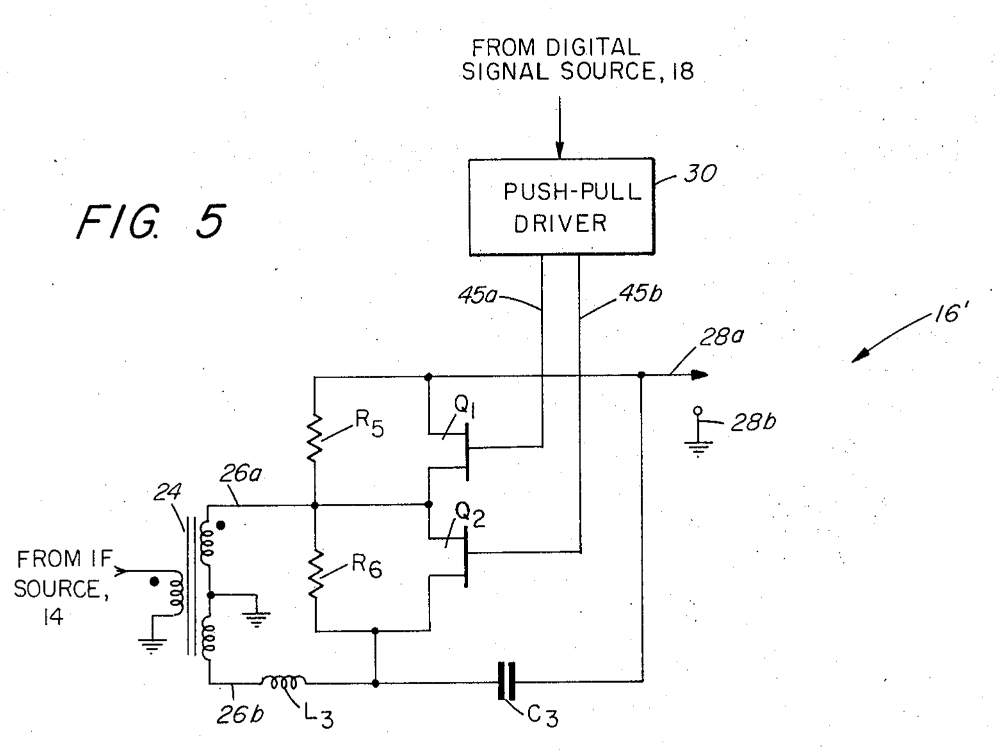
FIG. 5 is a schematic diagram of an alternate embodiment of a phase rotation modulator according to the principles of the invention.

Referring now to FIG. 5, an alternative phase rotation modulator 16' according to the invention is shown. Such modulator differs from the modulator shown in FIG. 2 in that capacitor $C_2$ shown in FIG. 2 is replaced by an inductor $L_3$ and that inductor $L_2$ shown in FIG. 2 is replaced by capacitor $C_3$. Further, the phase modulator 16' is coupled to an I.F. source 14', such source producing output signals having a frequency $f'_1$ lower than the series resonant frequency associated with $L_3$,$C_3$. That is, the IF signal here has a frequency $f'$ less than $1/2\pi\sqrt{L_3C_3}$. Also $1/2\pi f'C_3 >> 2\pi f'L_3$.

The operation of phase rotation modulator 16' is analogous to the operation of phase rotation modulator 16, and a little thought will make it apparent that the signals at terminal 28*a* will continuously rotate 180° in response to the binary signals produced by digital signal source 18 (FIG. 1).

While there has been illustrated and described preferred embodiments of the invention, numerous variations, substitutions and equivalents will now suggest themselves to those skilled in the art, all of which may be effected without departing from the spirit and scope of the appended claims.

What is claimed is:

1. A phase rotation modulator, comprising:
first and second oppositely phased voltage sources;
first and second switching elements serially connected and having a common terminal, the first voltage source being coupled to the terminal, the first switching means being coupled to an output of the phase rotation modulator; and
c. a network, such network including first and second reactive elements serially connected and being connected in common with the second switching means, the first reactive element being coupled to the output and the second reactive element being coupled to the second voltage source.

2. The phase rotation modulator recited in claim 1 including additionally:
a. a binary signal source; and
b. a driver means, responsive to the binary signal source for driving each one of the pair of switching elements, at a controlled rate, to mutually exclusive states.

3. The phase rotation modulator recited in claim 2 including additionally a first resistor connected in shunt across the first switching means and a second resistor connected in shunt across the second switching means.

4. A phase rotation modulator, comprising:
a. means for producing a pair of oppositely phased signals;
b. a binary signal source;
c. an output terminal; and
d. means, responsive to the binary signal, for coupling one of the pair of phased signals to the output terminal through a resistive network, the value of resistance of such network being in accordance with the binary signal and for coupling the other one of the pair of phased signals to such output terminal through a reactive network, the reactive characteristic of such network being inductive or capacitive in accordance with the binary signal.

5. In a radio frequency data communication system wherein a transmitter of such system includes a phase rotation modulator for changing the phase of an intermediate frequency signal 180° in accordance with binary data signals, heterodyning means for mixing the phase changed signal with a radio frequency signal, a bandpass filter for passing frequency components of the mixed and phase changed signal within the frequency bandpass of such filter, and a cross field amplifier for amplifying the signals passing through the bandpass filter, such phase rotation modulator comprising: an electrical network, coupled between a source of the binary data signals and the heterodyning means, such network having an phase changing rate characteristic related to the frequency bandpass of the bandpass filter for enabling a desired band of frequency components of the mixed and phase changed signals to pass through such filter to the cross field amplifier.

* * * * *